United States Patent [19]

Scheer

[11] Patent Number: 5,709,510
[45] Date of Patent: Jan. 20, 1998

[54] TOOL HOLDER FOR INSERTS

[75] Inventor: Gerhard Scheer, Loechgau, Germany

[73] Assignee: Komet Praezisionswerkzeuge Robert Breuning GmbH, Besigheim, Germany

[21] Appl. No.: 492,030

[22] PCT Filed: Nov. 19, 1993

[86] PCT No.: PCT/EP93/03237

§ 371 Date: Aug. 31, 1995

§ 102(e) Date: Aug. 31, 1995

[87] PCT Pub. No.: WO94/15742

PCT Pub. Date: Jul. 21, 1994

[30] Foreign Application Priority Data

Dec. 30, 1992 [DE] Germany .................. 42 44 485.3

[51] Int. Cl.$^6$ .................................................. B23B 29/03
[52] U.S. Cl. .................. 408/156; 407/9; 408/158; 408/181
[58] Field of Search .................. 408/153, 154, 408/156, 158, 159, 181; 407/8, 9, 10, 45, 89, 90

[56] References Cited

U.S. PATENT DOCUMENTS

| | | | |
|---|---|---|---|
| 3,827,823 | 8/1974 | Lhomme | 408/158 |
| 4,343,576 | 8/1982 | Logerholm et al. | 408/158 |
| 4,428,704 | 1/1984 | Kalokhe | 408/181 |
| 4,780,029 | 10/1988 | Beck | 408/156 |
| 4,786,217 | 11/1988 | Johne | 408/156 |

FOREIGN PATENT DOCUMENTS

| | | | |
|---|---|---|---|
| 291712 | 7/1991 | German Dem. Rep. | 408/159 |
| 596381 | 3/1978 | U.S.S.R. | 408/156 |
| 1502212 | 8/1989 | U.S.S.R. | 408/154 |

Primary Examiner—Daniel W. Howell
Attorney, Agent, or Firm—Flynn, Thiel, Boutell & Tanis, P.C.

[57] ABSTRACT

A clamp for indexable inserts used especially for turning. The clamp consists essentially of a clamp shaft and a clamp head combined with it in one piece. The clamp shaft can be secured to an axis-parallel clamping surface of a tool holder by a supporting surface obliquely transfixed by a clamping screw. The clamp head has an open-edged recess to take the indexable insert, one effective cutting corner of which projects on one side beyond the outer surface away from the support surface. In order to be able to adjust the distance between the clamping surface and the cutting corner, the clamp head has, in the free region between the recess, the supporting surface and the clamp shaft, a slot-like aperture having a curved cross-sectional shape open towards the clamp shaft. The clamp head can be elastically bent with respect to the clamp shaft under the effect of an adjuster.

26 Claims, 8 Drawing Sheets

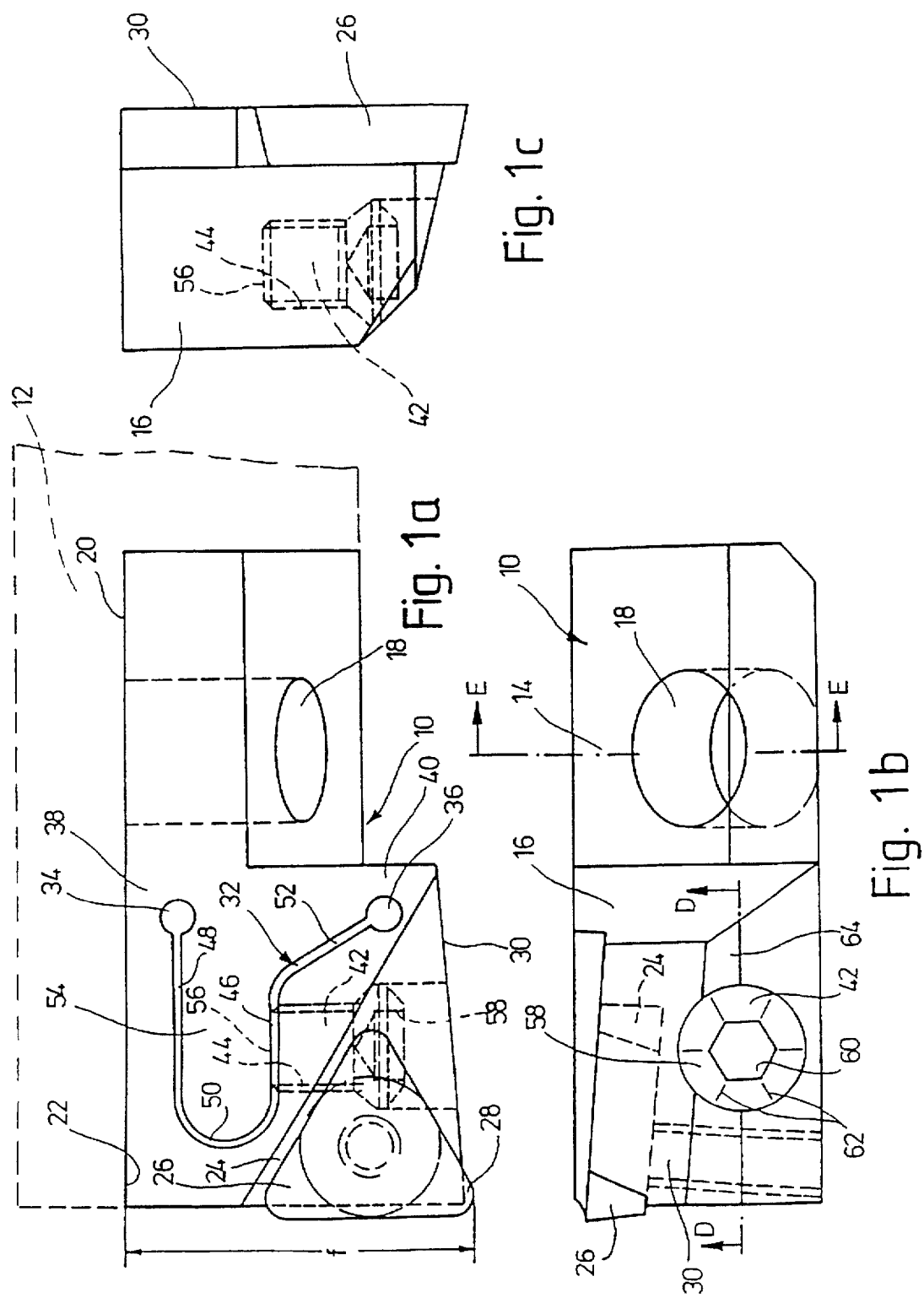

TOOL HOLDER FOR INSERTS

FIELD OF THE INVENTION

The invention relates to a tool holder for inserts, particularly indexable throwaway inserts, having a holder shank, which can be fastened to an axis-parallel clamping face of a tool carrier with a contact face being passed through, preferably obliquely, by a tightening screw. The tool carrier preferably configured as a boring bar, having a holder head, which is formed on the front side onto the holder shank and which includes a recess open at the margin for the reception of the insert which is aligned essentially perpendicular to the contact face and protrudes on one side with an active tool nose beyond the outer face that is facing away from the contact face, and having a device for adjusting the distance between the clamping face and the active tool nose.

BACKGROUND OF THE INVENTION

In known tool holders of this type (Cartridges type A for indexable throwaway inserts according to DIN 4985), which are clamped in a tool carrier with one or two fastening screws extending through an oblique elongate hole in the holder shank, there is provided a cross-setting screw for the adjustment of the distance between the clamping face and the active tool nose, which setting screw extends through an internal thread of the holder head and is supported with its tip against the clamping face of the tool carrier. The handling involved in carrying out the adjustment here is extremely awkward since, first of all, the fastening screw has to be loosened, then the cross-setting screw adjusted in the desired direction and finally the fastening screw re-tightened. This adjustment has to be repeatedly performed, where necessary, until the desired measure is exactly set. Further, it is considered a drawback in this adjusting operation that the setting angle of the insert is altered upon the adjustment of the distance measure, which is particularly disadvantageous where exactly defined shoulders are intended to be turned. Added to this is the fact that the cartridge does not bear with its contact face squarely upon the clamping face of the tool carrier, but rather, in forming a gap, a clamping triangle is created, the rigidity and damping characteristics of which often leave a lot to be desired, particularly in heavy-duty machine-cutting operations. The cross-setting screw is relatively small and consequently has only a small, keytype engagement, which is vulnerable to wear, and a small end face inclined toward the notch in the tool body.

Starting from this basis, the object of the invention is to provide a tool holder of the type stated in the introduction, which, when the fastening screw is fastened, can be adjusted in its distance measure between the clamping face and tool nose, simply and without adjustment of the setting angle.

In order to achieve this object, the combination of features specified in patent claim 1 is provided. Advantageous designs and refinements of the invention derive from the dependent claims.

SUMMARY OF THE INVENTION

The solution according to the invention is based upon the concept that the holder shank can be clamped rigidly in the tool carrier and that the holder head, by the introduction of suitable predetermined bending points, is elastically bendable in the desired direction, relative to the holder shank, with the aid of a control member. In order to achieve this, the following combination of features is proposed according to the invention:

the holder head, in the free region between recess, contact face and holder shank, is provided with a gap-shaped aperture which passes through parallel to or obliquely to the contact face and which exhibits an arc-shaped cross-sectional contour which is open toward the holder shank and is limited by two spaced apart aperture ends enclosed in the holder head material, one of the aperture ends being disposed close to the contact face and the other aperture end being disposed close to the outer face of the holder head, in each case forming a thin-walled material bridge;

the holder head, in the region of the two material bridges, being elastically bendable relative to the holder shank, under the influence of a control member, essentially perpendicular to the contact face.

The aperture ends herein are preferably disposed close to the holder shank, preferably in a plane perpendicular to the contact face. The bending zones at the aperture ends thereby form a type of articulated parallelogram, which ensures an inclination-free distance adjustment.

In the case of a tool holder in which the holder head, on the side lying opposite the contact face, protrudes in a step shape beyond the holder shank, it is preferable if the aperture end lying close to the outer face is disposed in the protruding part of the holder head.

Advantageous designs of the invention envisage:

that the aperture includes a gap segment located on the outer side, which gap segment lies preferably parallel to the contact face and is limited on the inner side by a flank of a shank-fixed extension arm;

that the aperture includes a gap segment located on the contact face side, which gap segment lies preferably parallel to the contact face and is limited by a flank of the shank-fixed extension arm;

that the gap segment located on the outer face side is connected to the gap segment located on the contact face side via a shank-remote, preferably arc-shaped transverse segment, limited by an end flank of the shank-fixed extension arm;

that the gap segment located on the contact face side is limited on the shank side by the aperture end lying close to the contact face;

that the gap segment located on the outer face side is adjoined by an oblique segment running obliquely to the shank side and in the direction of the outer face and limited by the aperture end lying close to the outer face.

In consideration of these measures, the control member is able to be realized differently, namely:

by a setting screw which can be actuated from the outer face of the holder head, is guided in an internal thread of the holder head essentially perpendicularly to the contact face, penetrates the gap segment located on the outer face side and can be pressed with its preferably flattened end face against the shank-fixed extension arm;

by a setting screw which reaches from the outer face through the holder head and can be pressed with its end face against the clamping face of the tool carrier and which preferably extends transversely through the extension arm and the two gap segments and is guided either within an internal thread located directly in the holder head or in the internal thread of a threaded bushing, which threaded bushing is inserted from the contact face into a recess of the holder head in twist-proof securement and is supportable against a stop of the holder head;

by a setting screw which can be actuated from the end face of the holder head, is guided by an internal thread of the holder head essentially parallel to the contact face, penetrates the transverse segment of the aperture and can be pressed with a conical part of its tip against the oblique or arc-shaped end flank of the shank extension arm;

by a control member which is guided in a slideway or threaded guide of the tool carrier and can be pressed with a force component, in the direction of adjustment, against the tool head;

by a setting screw which is guided in a preferably radially or axially aligned internal thread of the tool carrier and is provided, where necessary, with a conical tip;

by a control body which is guided in a preferably radial slideway of the tool carrier and can be actuated by means of a wedge gearing disposed in the tool carrier and preferably including a control rod with a wedge bevel.

In order, to enable a defined and reproducible distance adjustment by simple means, a scale graduation is provided in the region of the setting screw head.

In order to stiffen the clamping connection between tool holder and tool carrier, it is advantageous if the gap-shaped aperture runs obliquely relative to the contact face in the direction of the aperture and at an angle, diverging preferably from the insert side, of 1° to 10°, preferably 2° to 5°.

The enclosed, gap-shaped aperture preferably is formed by spark-erosive cutting with a wire-electrode arrangement. In order to facilitate production, the aperture ends can include, to this end, a cross section which is widened relative to the gap cross section and can be produced by a boring operation.

BRIEF DESCRIPTION OF THE DRAWINGS

The invention is explained in greater detail below with reference to some illustrative embodiments represented schematically in the drawing, in which:

FIGS. 1a to 1c show three different side views of a cartridge;

DETAILED DESCRIPTION

Figure 6A:
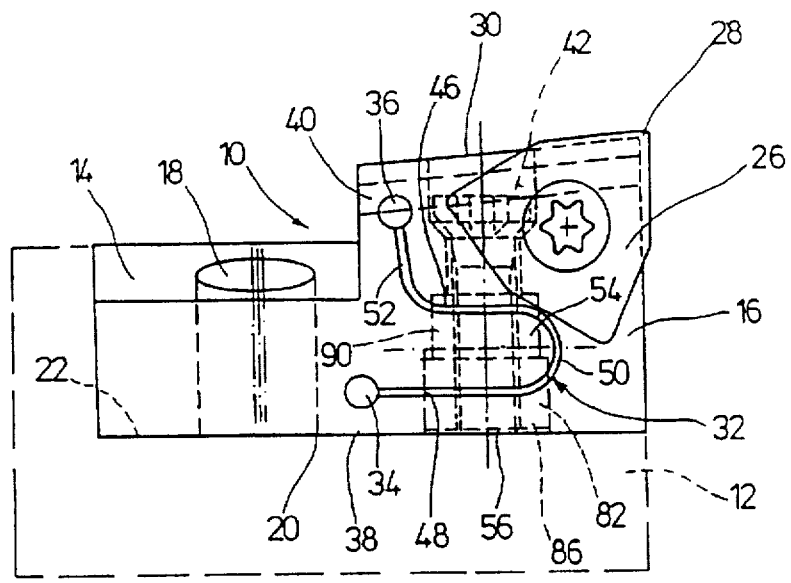
FIGS. 6a to 6c show a side view, a frontal view and a longitudinal section of a cartridge having a threaded bushing and a pass-through setting screw.
Figure 6B:
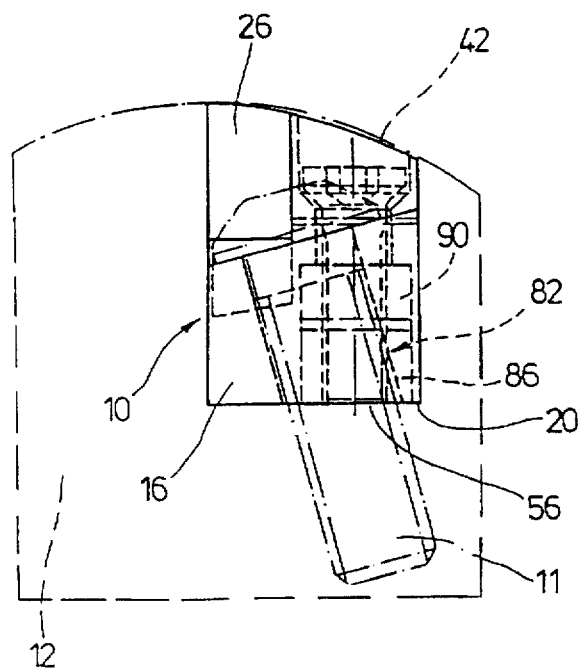
Figure 6C:
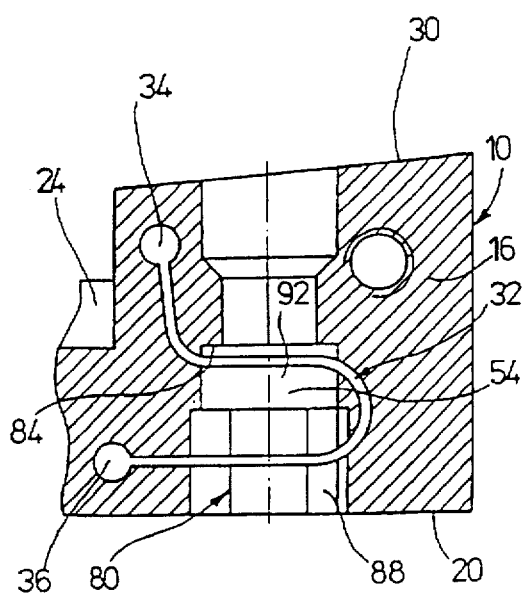
Figure 7C:
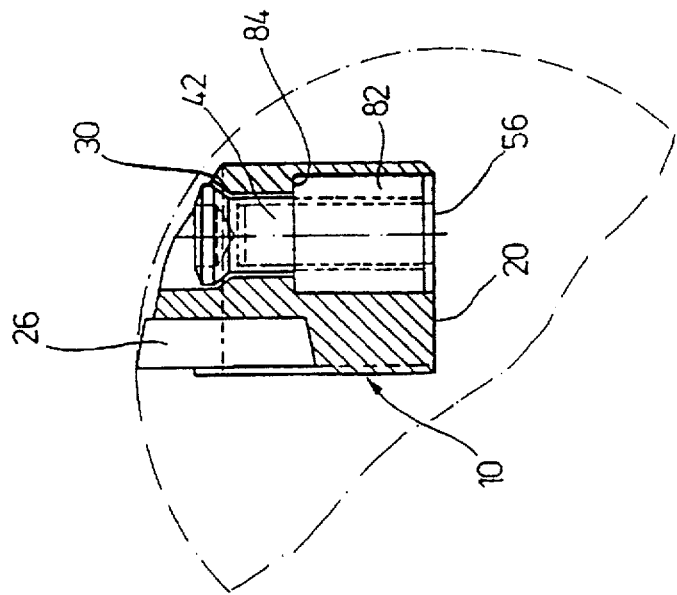
FIGS. 7a to 7c show a modified illustrative embodiment of a cartridge having a threaded bushing and a pass-through setting screw.
Figure 7B:
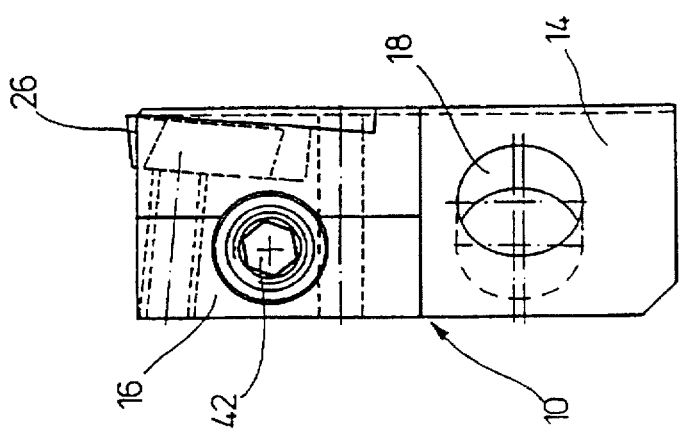
Figure 7A:
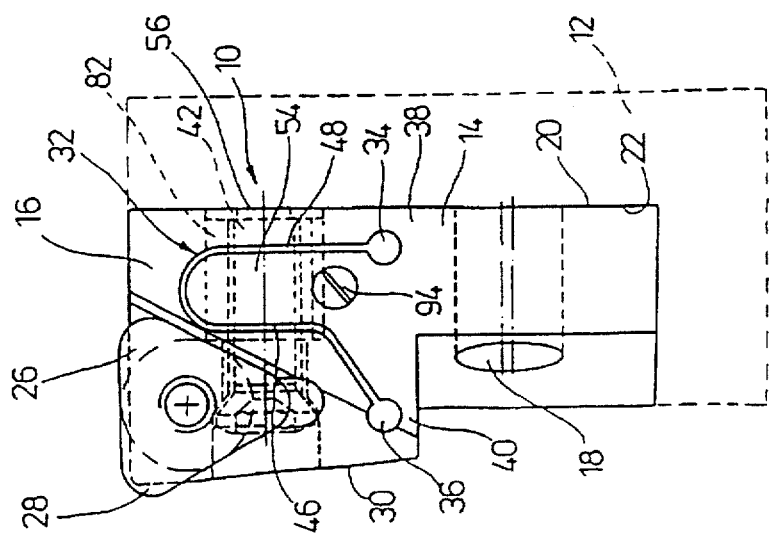

The cartridges 10 represented in the drawing are intended to receive indexable throwaway inserts made from hard metal, a ceramic cutting material or other cutting materials and are predominantly used for turning jobs. To this end, the cartridges 10 are fastened by a tightening screw 11 (FIG. 6b) to a tool carrier 12 preferably configured as a boring bar.

The cartridges essentially comprise a holder shank 14 and a holder head 16, which is formed with the front side onto the holder shank 14 and protrudes in a step shape outwardly beyond said holder shank. The holder shank 14 includes a contact face 20, which is obliquely passed through by an elongate hole 18 for the reception of the tightening screw 11 and which bears against an axial clamping face 22 of the tool carrier 12. The holder head 16 is provided with a recess 24 which is open at the margin and, in which an indexable throwaway insert 26 is disposed such that an active tool nose 28 thereof protrudes toward the outer face 30 which faces away from the contact face 20. The distance measure f between the clamping face 22 of the tool carrier 12 and the tool nose 28 can be set, within certain limits, by the adjusting device explained in greater detail below.

The adjusting device essentially comprises a gap-shaped aperture 32, which passes parallel to the contact face 20 through the holder head 16 and which is disposed in the free region between the recess 24, the contact face 20 and the holder shank 14 and includes an arc-shaped channel which is open toward the holder shank 14 and is limited by the enclosed aperture ends 34, 36 widened in their cross-sectional dimension. The aperture ends 34, 36 are disposed in a plane perpendicular to the contact face 20 and limit, with the contact face 20 and the outer face 30, respective thin-walled material bridges 38, 40. The holder head 16, in the region of the two material bridges 38, 40, is elastically bendable relative to the holder shank 14 and perpendicularly to the contact face 20 under the influence of a control member 42.

Figure 1D:
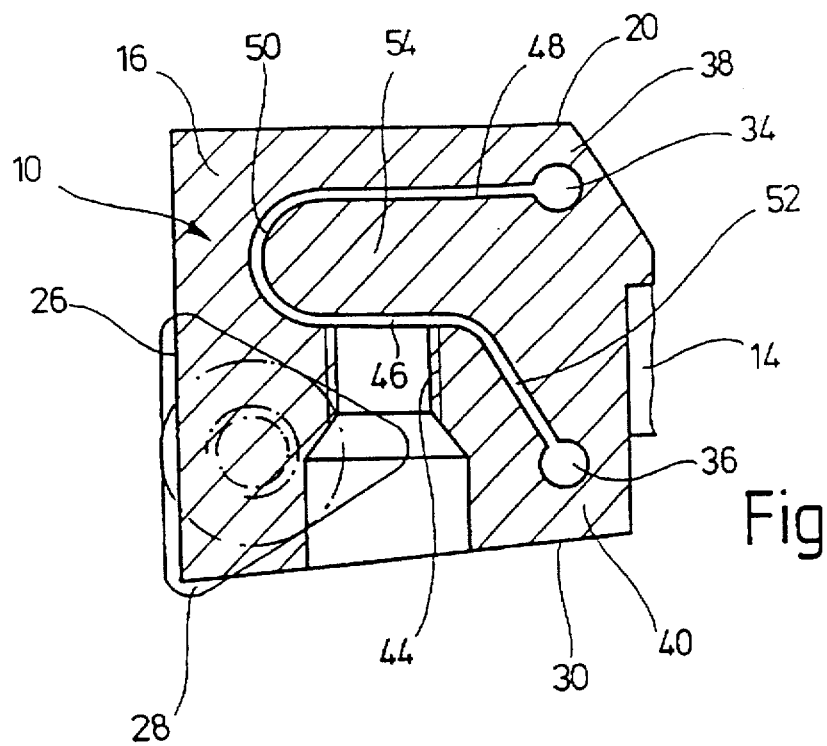
FIG. 1d shows a longitudinal section through the holder head along the sectional line D—D of FIG. 1b.
Figure 1E:
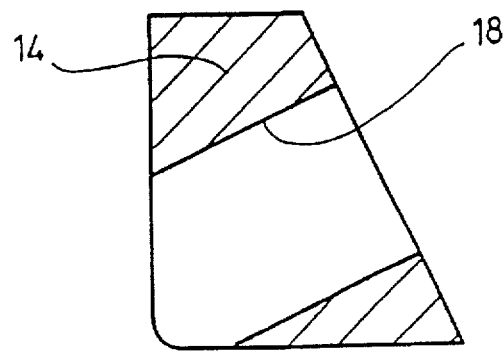
FIG. 1e shows a section through the holder shank along the sectional line E—E of FIG. 1b.
Figure 1F:
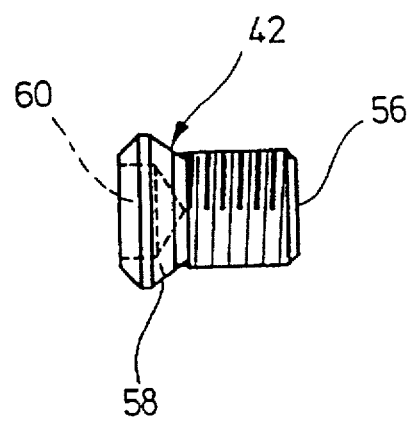
FIG. 1f shows a side view of the setting screw of the cartridge according to FIGS. 1a to e.

As can be seen, in particular, from FIG. 1d, the aperture includes, respectively, a gap segment 46 located on the outer face side and lying parallel to the contact face 20 and a gap segment 48 located on the contact face side, which are interconnected by a bent cross or transverse section 50 remote from the shank. While the gap segment 48 located on the contact face side is directly limited by the aperture end 34 lying close to the contact face, the gap segment 46 located on the outer face side is connected, via an oblique segment 52 running obliquely to the shank side and in the direction of the outer face 30, to the aperture end 36 lying close to the outer face. In this way, a shank-fixed extension arm 54 is formed, which, with its outer flanks, defines the gap segments 46, 48, 50, 52 on the inner side.

In the illustrative embodiment shown in FIGS. 1a to f, the control member 42 is formed as a setting screw, which is guided into an internal thread 44 of the holder head 16 perpendicularly to the contact face 20 and with its flattened end face 56 extends through the gap segment 46 located on the outer side and can be pressed against the shank-fixed extension arm 54. The setting screw 42 is accessible through the outer face 30 of the holder head 16. It includes a head 58 having a hexagonal socket 60, which head has a scale graduation 62 in the annular region thereof surrounding the hexagonal socket 60. Instead of a zero mark, the holder head 16 includes, in the region of its outer face 20, an orientation edge 64 extending radially to the internal thread 56. By tightening of the setting screw 42 against the shank-fixed extension arm 54, the holder head 16, in the region of the material bridges 38, 40, is bent elastically outward relative to the holder shank 14, with the distance measure f being adjusted and its angular orientation being maintained. Given suitable calibration, the distance alteration can be read directly from the scale 62.

Figure 2:
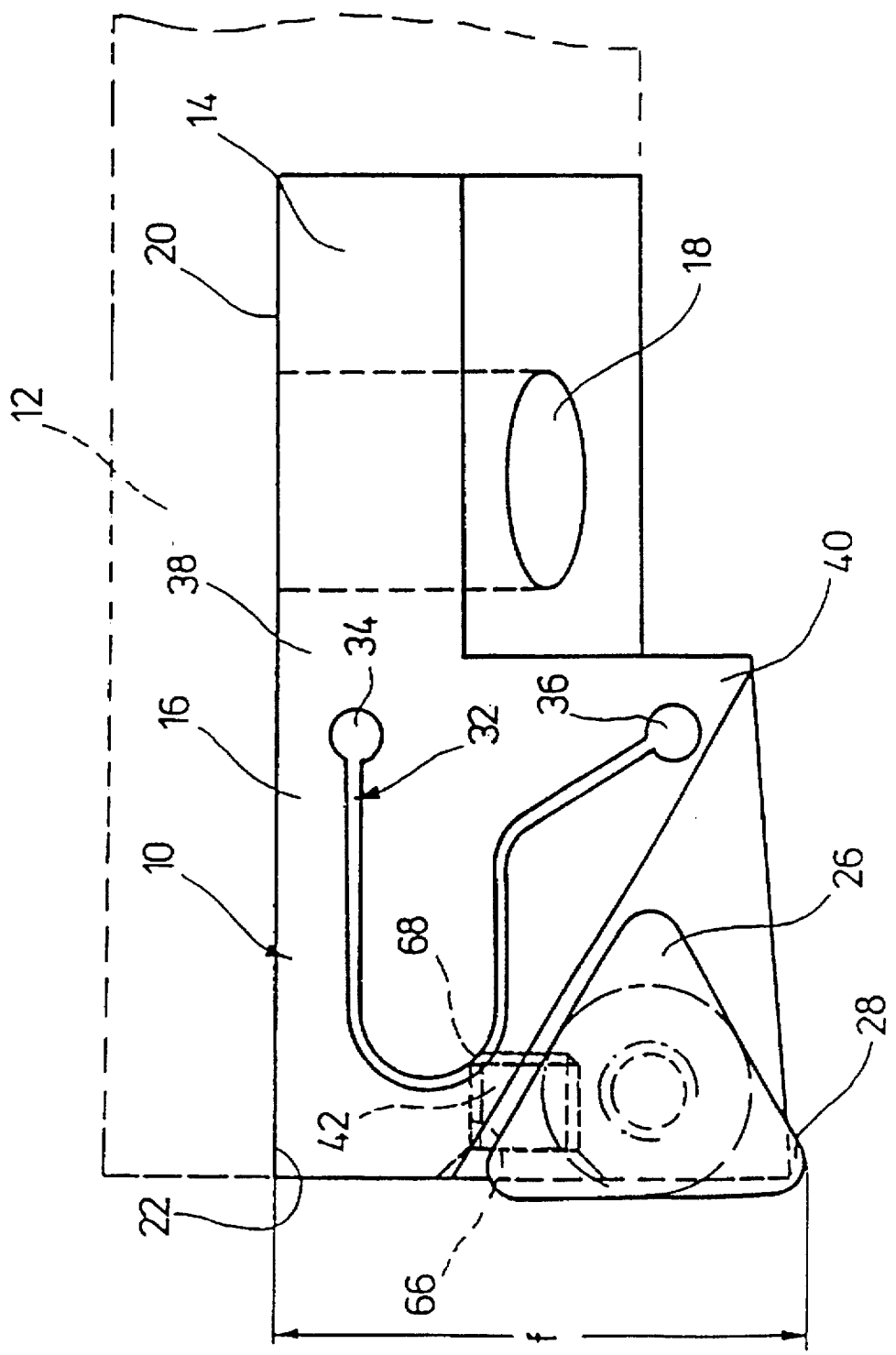
FIG. 2 shows a side view of a cartridge corresponding to FIG. 1a, having a setting screw which can be actuated on the front side.

In the illustrative embodiment shown in FIG. 2, the holder head 16 includes an internal thread 66 which is aligned parallel to the contact face 20 and in which a setting screw, accessible through the front side, is guided as a control member 42. There, the setting screw 42 bears with its conical tip part 68 against an oblique part of the curved transverse segment 50 and when tightened, results in a bending of the holder head 16 relative to the holder shank 14 in the region of the material bridges 38, 40 and hence to an adjustment of the distance measure f.

Figure 3:
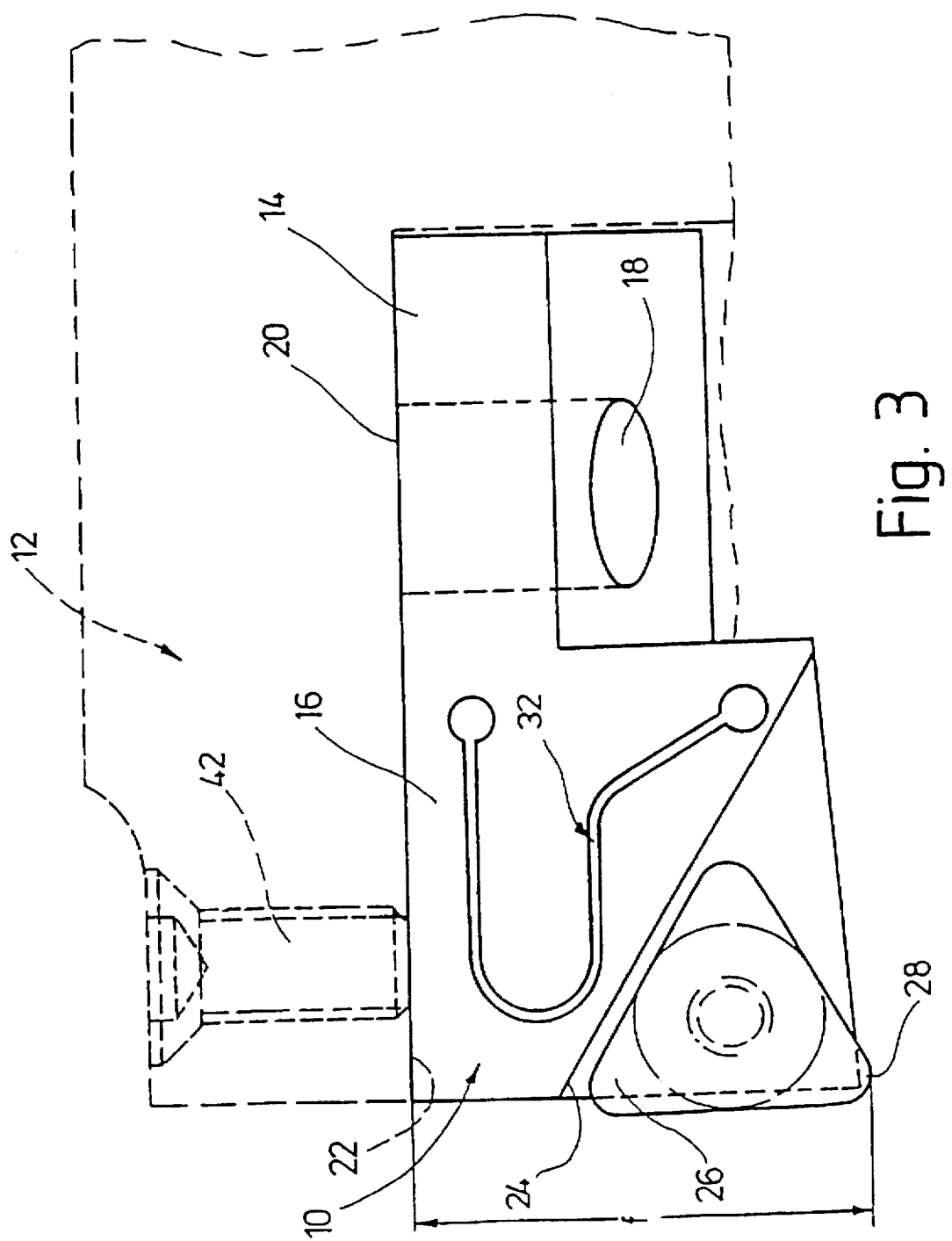
FIG. 3 shows a side view of a cartridge having a radial setting screw disposed in the tool carrier.
Figure 4:
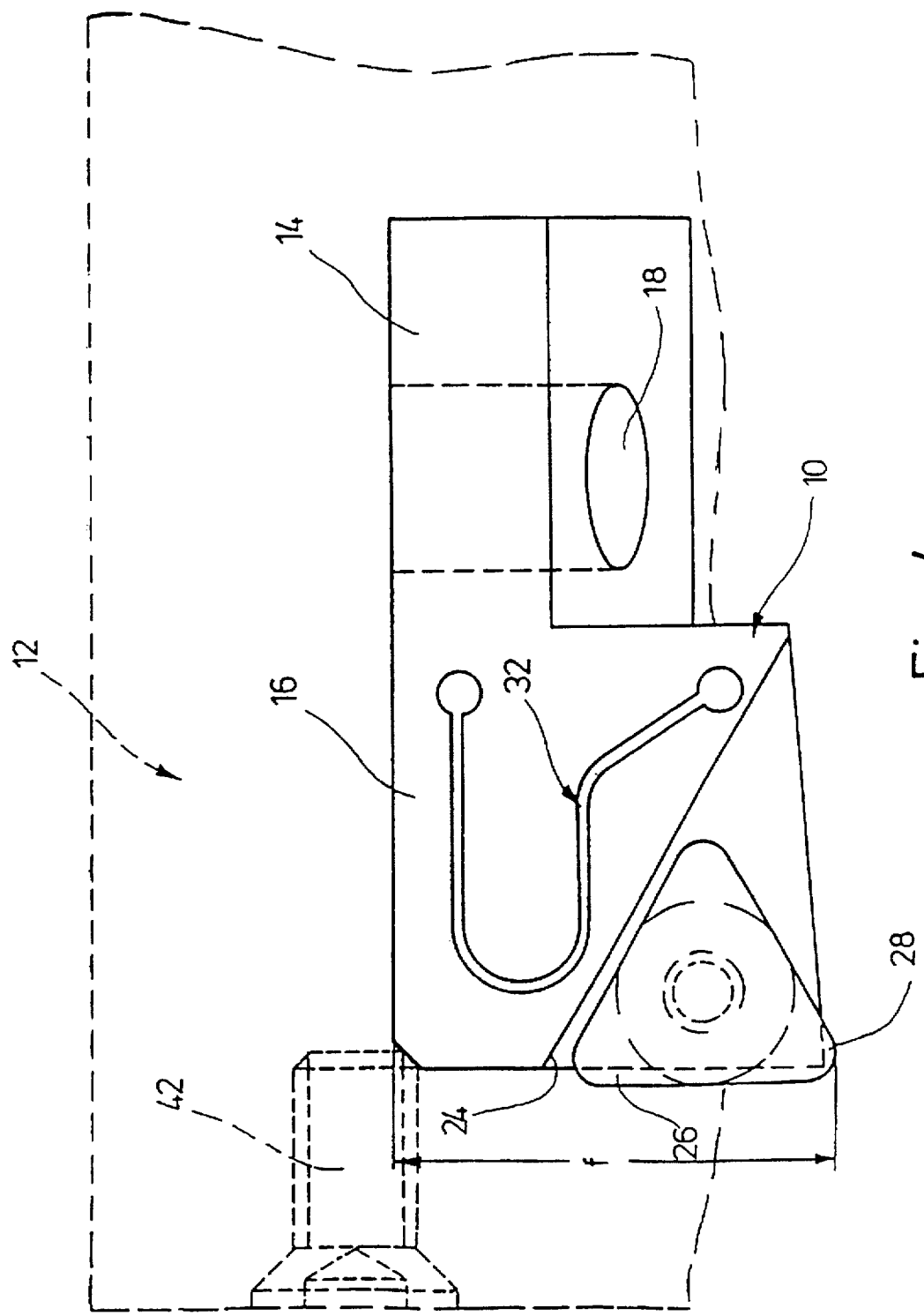
FIG. 4 shows a side view of a cartridge having a radial setting screw disposed in the tool carrier.

In the illustrative embodiments according to FIGS. 3 and 4, the control members 42 are disposed, in the form of a radial and axial setting screw, in the tool carrier 12. In the case of FIG. 3, the setting screw bears with its flattened tip against the contact face 20 in the region of the holder head 16 and, in the case of FIG. 4, with an outer cone 68 against a wedge face 70 in the rearward, frontal region of the holder head 16. By tightening the setting screws 42 in question, the holder head 16, in the region of the material bridges 38, 40, is bent elastically outward relative to the holder shank 14, the distance measure f being altered.

Figure 5:
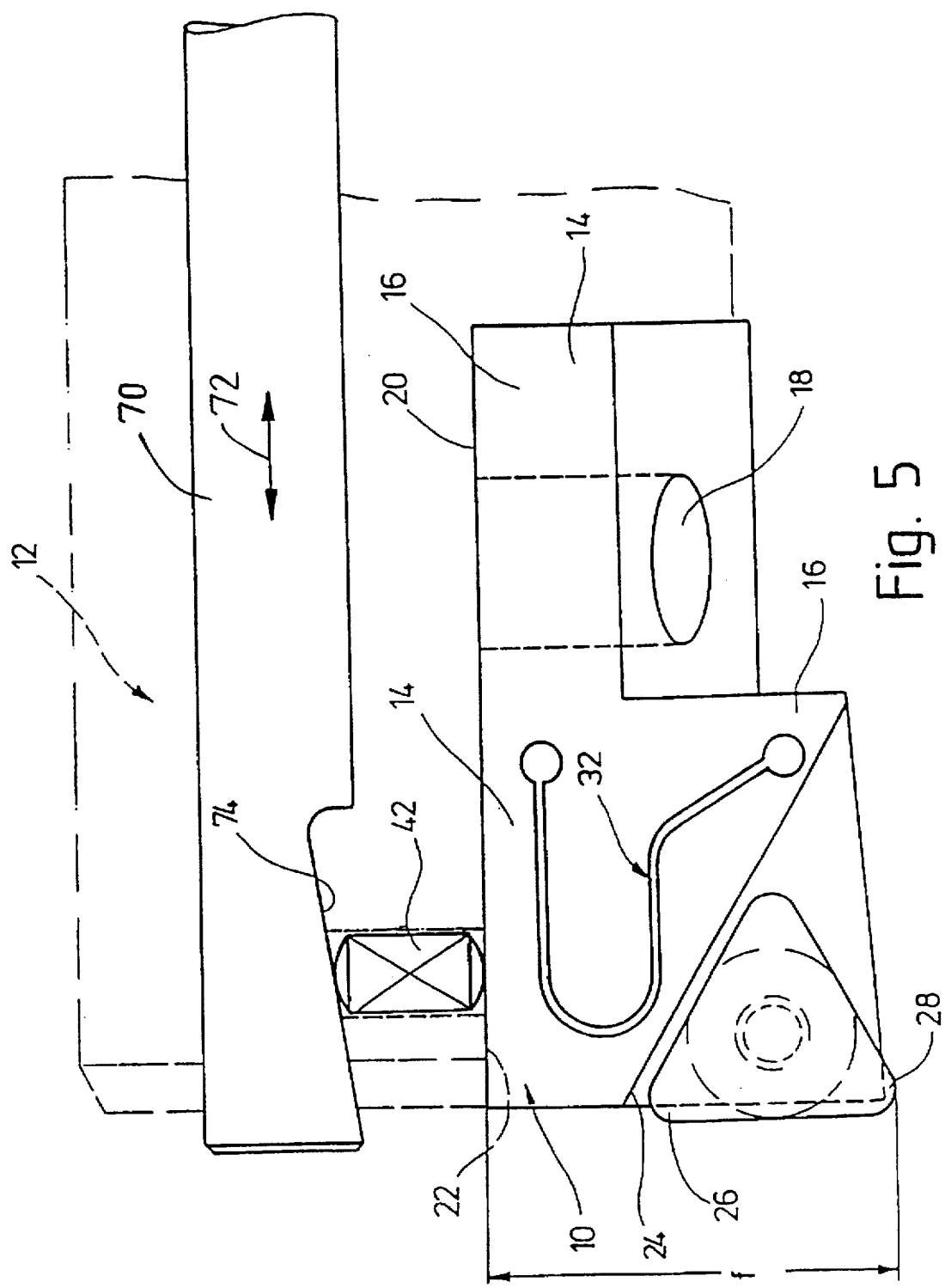
FIG. 5 shows a side view of a cartridge having a control body and control rod in the tool carrier.

In the illustrative embodiment according to FIG. 5, instead of the setting screw there is provided, as a control member 42, a control body guided in a slideway of the tool carrier 12, which control body can be actuated by means of a setting rod 70 having a wedge bevel 74, which setting rod is guided in the tool carrier 12 and is displaceable centrally, by means of the machine tool, in the direction of the double arrow 72.

In the illustrative embodiments shown in FIGS. 6a to c and 7a to c, the control members 42 are configured as setting screws which pass through the holder head 16 and are supportable with their flattened end face 56 against the clamping face 22 of the tool carrier 12 and which extend through the internal thread of a threaded bushing 82 disposed in a recess 80 of the holder head 16. The threaded bushing 82 is inserted through the contact face 20 into the recess 80 and is supported with its front edge 84 pointing toward the clamping face 22 against an annular shoulder 84 within the holder head, on the outer side of the gap segment 46 located on the outer face side. For the rotational securement of the threaded bushing 82, the threaded bushing 82, in the illustrative embodiment according to FIGS. 6a to c, includes a hexagonal segment 86, which is engaged within a complementary hexagonal socket 88 of the recess 80. A cylindrical centering lug 90, which is engaged within a cylindrical segment 92 of the recess 80, in this case ensures a centering of the threaded bushing 82 in the holder head 16. In the illustrative embodiment according to FIGS. 7a to c, the threaded bushing 82 includes an outer surface which is cylindrical over the entire height and which, in the recess 82, is secured against twisting on the holder head 16 with the aid of a securing screw 94 which intersects the outer surface. By tightening the setting screw 42 against the clamping face 22 of the tool holder, the threaded bushing 82 is simultaneously supported against the inner shoulder 88, and the holder head 16, in the region of the material bridges 38, 40, and is bent elastically outward, with the distance measure f being adjusted.

By way of a summary, the following can be stated: the invention relates to a tool holder for indexable throwaway inserts, which is used, above all, for turning jobs. The tool holder essentially comprises a holder shank 14 and a holder head 16 connected thereto in one piece. The holder shank can be fastened to an axis-parallel clamping face of a tool carrier 12 with a contact face 20 being obliquely passed through by a tightening screw. The holding head 16 includes a recess 24 open at the margin for the reception of the indexable throwaway insert 26, which insert protrudes on one side with an active tool nose 28 beyond the outer face 30 that is facing away from the contact face 20. In order to enable an adjustment of the distance f between a clamping face 22 and the tool nose 28, the holding head 16 is provided with a gap-shaped aperture in the free region between the recess 24, the contact face 20 and the holder shank 15, which aperture exhibits an arc-shaped cross-sectional contour that is open toward the holder shank 14. The holder head is elastically bendable relative to the holder shank 14 under the influence of a control member 42.

The embodiments of the invention in which an exclusive property or privilege is claimed are defined as follows:

1. A tool holder for supporting inserts which is mountable to a tool carrier, the tool carrier being configured as a boring bar and including a clamping face extending substantially parallel to an axis thereof, the tool holder having a contact face which extends forwardly and faces inwardly toward the clamping face and an outer face which extends forwardly and faces outwardly away from the contact face, the tool holder having a holder shank which includes fastening means for fastening the holder shank to the clamping face of the tool carrier, and having a holder head which is formed on a front side of the holder shank and which includes a recess that is open at an outer margin of the holder head for the reception of an insert therein, the insert being aligned essentially perpendicular to the contact face and having an active tool nose on one side thereof which protrudes outwardly from the outer face of the holder head, the tool holder having an adjustment device for adjusting a distance between the clamping face and the active tool nose, the adjustment device including a gap-shaped aperture which, in the free region between the recess, the contact face and the holder shank passes through the holder head parallel or obliquely to the contact face, the gap-shaped aperture having inner and outer aperture ends which are disposed in the material of the holder head and are spaced apart, the inner aperture end being disposed close to the contact face on a contact face side of the holder head to define a first material bridge proximate thereto and the outer aperture end being disposed close to the outer face of the holder head on an outer face side of the holder head to define a second material bridge proximate thereto, the adjustment device further including a control member which contacts the holder head proximate the gap-shaped aperture, the holder head in the region of the first and second material bridges being elastically bendable relative to the holder shank under the influence of the control member essentially perpendicular to the contact face so as to vary the distance between the clamping face and the active tool nose, the gap-shaped aperture including an arc-shaped cross-sectional gap section which has an arc-shape that is open rearwardly at a rear margin thereof toward the holder shank and is limited by the two aperture ends disposed on the rear shank side, said arc-shaped gap section extending on a forward side thereof spaced away from the holder shank into a region of the holder head lying between the recess and the contact face.

2. The tool holder as claimed in claim 1, wherein the inner and outer aperture ends are disposed close to the holder shank.

3. The tool holder as claimed in claim 1, wherein the inner and outer aperture ends are disposed in a plane perpendicular to the contact face.

4. The tool holder as claimed in claim 1, wherein the holder head includes a protruding part on the outer face side lying opposite the contact face which protrudes in a step shape outwardly from the holder shank, the outer aperture end lying close to the outer face being disposed in the protruding part of the holder head.

5. The tool holder as claimed in claim 1, wherein the holder head defines a shank-fixed extension arm which has a fixed rearward side near the head shank and is defined on a forward side by the arc-shaped gap section, the arc-shaped gap section including an outer gap segment located on the outer face side which said outer gap segment lies parallel to the contact face and is defined on an inner side thereof by an outer flank of the extension arm.

6. The tool holder as claimed in claim 1, wherein the holder head defines a shank-fixed extension arm which has a fixed rearward side near the head shank and is defined on a forward side by the arc-shaped gap section, the arc-shaped section including an inner gap segment located on the contact face side, which said inner gap segment lies parallel to the contact face and is defined by an inner flank of the extension arm.

7. The tool holder as claimed in claim 5, wherein the arc-shaped gap section includes an inner gap section disposed on the contact face side substantially parallel to the contact face and is defined by an inner flank of the extension arm, the outer gap segment located on the outer face side being connected to the inner gap segment by a transverse segment disposed forwardly of the holder shank, the transverse segment being defined by an end flank of the extension arm.

8. The tool holder as claimed in claim 6, wherein the inner gap segment located on the contact face side is limited on the side thereof near the holder shank by the inner aperture end disposed close to the contact face.

9. The tool holder as claimed in claim 5, wherein the outer gap segment located on the outer face side is adjoined by an oblique segment running obliquely at an angle relative to the outer gap segment so as to extend rearwardly toward the holder shank and outwardly in the direction of the outer face, said oblique segment being limited by the outer aperture end lying close to the outer face.

10. The tool holder as claimed in claim 5, which comprises a setting screw forming the control member, the setting screw being actuatable from the outer face of the holder head and being guided in an internal thread section of the holder head essentially perpendicularly to the contact face, the setting screw penetrating the outer gap segment located on the outer face side and being pressable with a flattened end face thereof against the adjacent outer flank of the extension arm.

11. The tool holder as claimed in claim 7, which comprises a setting screw forming the control member, the setting screw being actuatable from a front end face of the holder head and being guided within an internal thread section of the holder head essentially parallel to the contact face, the setting screw penetrating the transverse segment and being pressable with a conical part of a tip thereof against the end flank of the extension arm, the end flank having an obliquely angled shape or an arc-shape.

12. The tool holder as claimed in claim 1, wherein the control member is configured as a setting screw which extends from the outer face through the holder head and has an end face which is pressable against the clamping face of the tool carrier.

13. The tool holder as claimed in claim 12, wherein the arc-shaped gap section includes inner and outer gap segments which extend forwardly away from said respective inner and outer aperture ends, the setting screw extending transversely through the extension arm and the inner and outer gap segments.

14. The tool holder as claimed in claim 12, wherein the setting screw is guided within an internal thread section located in the region disposed outwardly of the extension arm directly on the holder head.

15. The tool holder as claimed in claim 1, which comprises a threaded bushing which is inserted from the contact face in twist-proof securement into a recess of the holder head, the holder head including an inward facing stop in the recess and the threaded bushing being supportable against the stop of the holder head, a setting screw forming the control member and being screwed into engagement with an internal thread of the threaded bushing from the outer face.

16. The tool holder as claimed in claim 15, wherein the setting screw extends through the threaded bushing and has an end face which is pressable against the clamping face of the tool carrier.

17. The tool holder as claimed in claim 15, wherein the arc-shaped gap section has an outer gap segment extending forwardly from the outer aperture end, and the threaded bushing extends through the extension arm of the holder shank and the outer gap segment which is located on the outer face side.

18. The tool holder as claimed in claim 15, wherein the threaded bushing includes a polygonal segment which is engaged in twist-proof securement in a complementary polygonal socket of the holder head and of the extension arm.

19. The tool holder as claimed in claim 15, wherein the arc-shaped gap section has an outer gap segment extending forwardly from the outer aperture end, and the stop is formed by an inner shoulder in the holder head material on the outer side of the outer gap segment which is located on the outer face side.

20. The tool holder as claimed in claim 15, wherein the threaded bushing is secured in the recess against twisting by means of a securing screw or securing pin connected between the threaded bushing and the holder head.

21. The tool holder as claimed in claim 1, wherein the control member is guided in a slideway or threaded guide of the tool carrier and is pressed with a force component against the holder head in a direction of adjustment.

22. The tool holder as claimed in claim 21, wherein said holder head extends outwardly in a radial direction and forwardly in an axial direction, the control member being configured as a setting screw which is guided in a radially or axially aligned internal thread of the tool carrier and is provided with a conical tip.

23. The tool holder as claimed in claim 21, wherein said head holder extends outwardly in a radial direction and forwardly in an axial direction, the control member comprising a control body which is guided in a radial slideway of the tool carrier and is actuated by means of a wedge gearing disposed in the tool carrier which includes a control rod having a wedge bevel.

24. The tool holder as claimed in claim 10, which comprises a scale graduation disposed on the setting screw.

25. The tool holder as claimed in claim 1, wherein the inner and outer aperture ends have a circular cross section which is widened relative to a gap width of the arc-shaped gap section.

26. The tool holder as claimed in claim 1, wherein the gap-shaped aperture runs obliquely relative to the contact face in the direction toward the outer end aperture diverging from the insert side at an angle of 1° to 10°.

* * * * *